United States Patent [19]
Karlish et al.

[11] Patent Number: 5,327,018
[45] Date of Patent: Jul. 5, 1994

[54] INTERFACE CIRCUIT FOR CHIP CARDS

[75] Inventors: Thierry Karlisch, Aubagne; Jacek Kowalski, Trets; Patrice Peyret, Aix en Provence, all of France

[73] Assignee: Gemplus Card International, Gemenos, France

[21] Appl. No.: 969,414

[22] Filed: Oct. 30, 1992

[30] Foreign Application Priority Data

Oct. 31, 1991 [FR] France .................. 91 13528

[51] Int. Cl.[5] ........................................ H03K 17/50
[52] U.S. Cl. ............................ 307/244; 307/303.1; 307/303.2
[58] Field of Search ............. 307/303.1, 303.2, 475, 307/481, 244

[56] References Cited

U.S. PATENT DOCUMENTS

| 4,827,450 | 5/1989 | Kowalski | 365/185 |
| 4,868,489 | 9/1989 | Kowalski | 324/61 |
| 4,881,199 | 11/1989 | Kowalski | 365/189.01 |
| 4,890,187 | 12/1989 | Tailliet et al. | 361/111 |
| 4,896,298 | 1/1990 | Kowalski | 365/189.01 |
| 4,959,197 | 1/9990 | Parekh et al. | 422/101 |
| 5,000,371 | 3/1991 | Tailliot et al. | 357/42 |
| 5,060,198 | 10/1991 | Kowalski | 365/201 |
| 5,060,261 | 10/1991 | Auenier et al. | 380/3 |
| 5,097,146 | 3/1992 | Kowalski | 307/350 |

FOREIGN PATENT DOCUMENTS

WO92/15074 2/1992 PCT Int'l Appl.

Primary Examiner—Margaret Rose Wambach
Attorney, Agent, or Firm—Nilles & Nilles

[57] ABSTRACT

The invention concerns interface circuits for chip card readers. It consists of providing link connections between this circuit and the reader, these connections being identical to those established between the circuit and the chip card. An internal switch (102) in the circuit is used to link these connections together, or to a control register (101), which is internal to the circuit, and actuated by an additional control connection. With the invention, it is possible to limit the number of connections between the circuit and the reader and to control the circuit with a software interface which is identical to the control interface of a chip card.

3 Claims, 2 Drawing Sheets

FIG_1
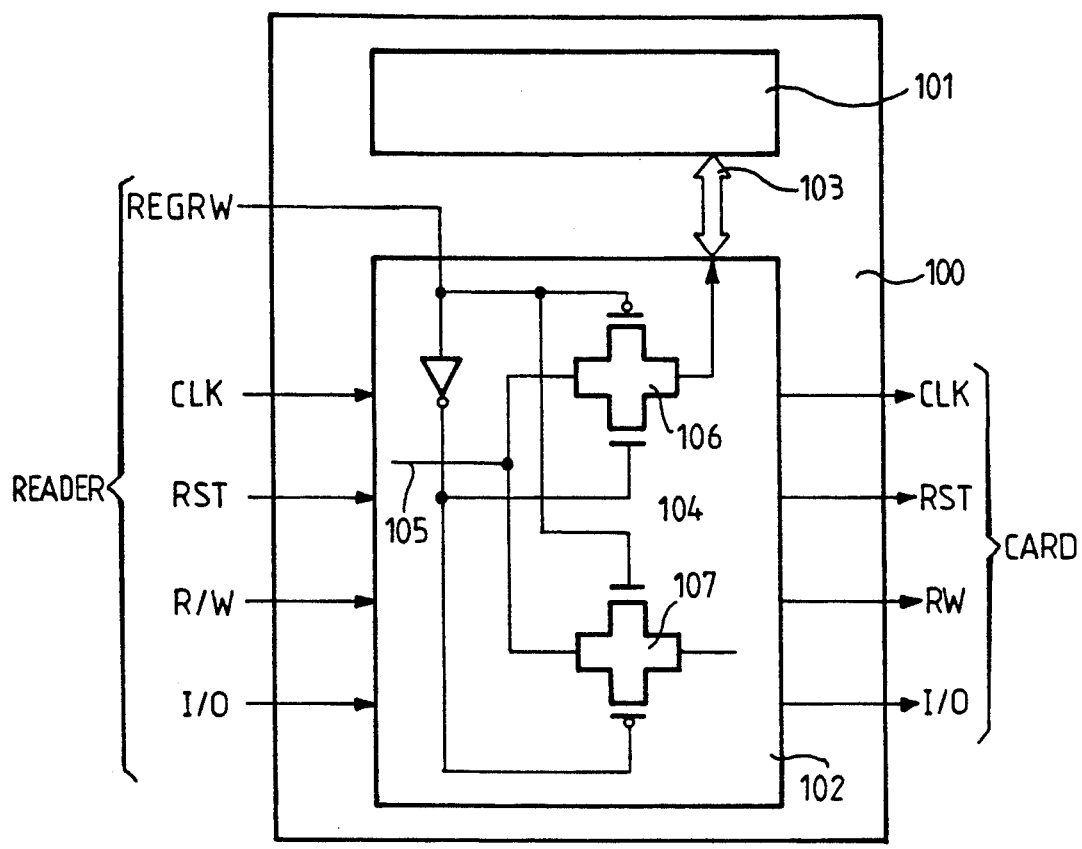
FIG_2
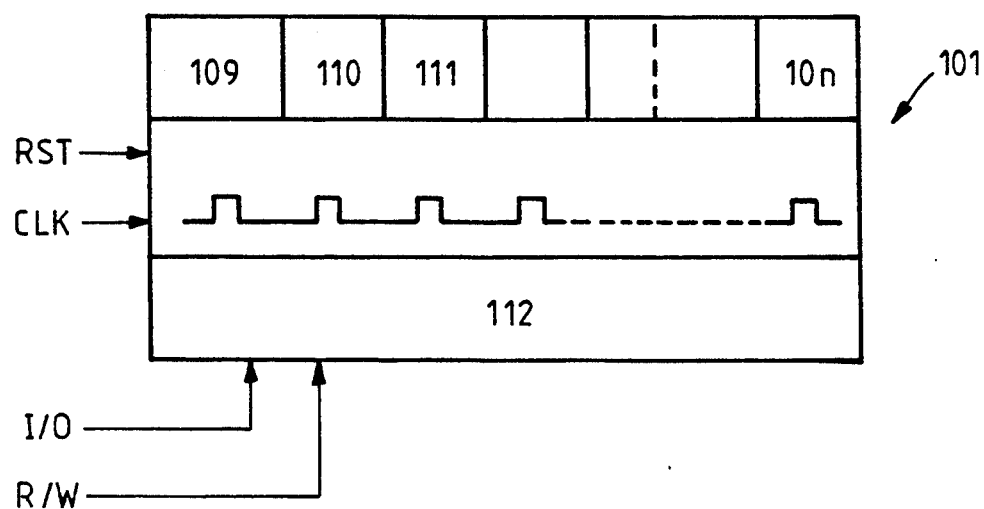

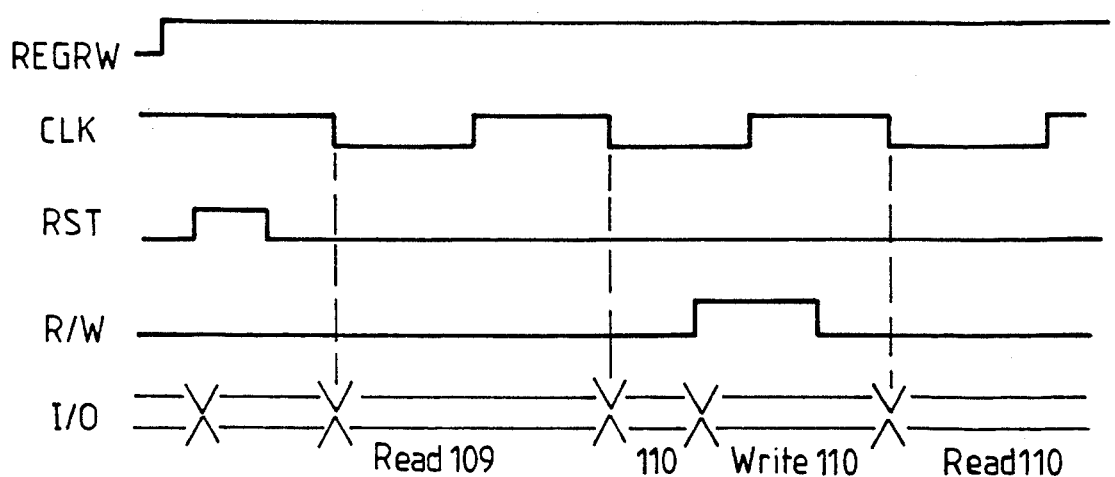
FIG_3

INTERFACE CIRCUIT FOR CHIP CARDS

BACKGROUND OF THE INVENTION

This invention concerns specialized circuits which are used to form an interface between a chip card, also known as a "microprocessor card" or chip card and the operating circuits in the reader to which the card is connected in order to operate it.

Microprocessor cards currently known can contain highly diverse printed circuits, ranging from a simple memory chip (telephone card) to a complete microprocessor with RAM and ROM. However, their physical interface is standardized in terms of the number (normally 8) and assignment of contacts with the outside world, namely with the different readers which are used, first of all to programme the card during the manufacturing process and then to operate it when in service. Certain voltages, such as programming voltages, for example, may differ from one card to another.

Furthermore, the software interface (or protocol), in other words the sequencing of signals on the contacts, is either standardized, in the case of asynchronous circuits (ISO norm) or non-standardized, in the case of synchronous circuits.

For example, for a synchronous circuit (generally a memory chip alone, without a microprocessor), one has direct current circuit power connections, earth connections, trigger connections (RST) and three connections which transmit clock signals (CLK), data signals (I/O) and signals for conditioning the memory into read or write (R/W). It is also possible, for example, with this type of synchronous circuit, for the clock pulse count to address successive memory cells in this memory. Non-standardized management protocols in these synchronous circuits use, in particular, all four of the above connections (RST, CLK, I/O, R/W) in order to operate the card.

The circuits in the reader form a computer system based on one or more microprocessors and are comparable to a common-type micro-computer. To form the interface between this computer system and the chip card, specialized integrated circuits, providing the following functions, are generally used:

management of voltage sequencing during powering of the chip card;

protection against overvoltage or short-circuits, management of voltage sequencing when the card is removed from the reader, generation of regulated supply and programming voltages (VCC and VPP), management of 8 card contacts, software interfacing.

In particular, we can quote the L 6603 and L 6604 circuits made by SGS THOMSON and MTC 6012 A and 6012 from MIETEC. The purpose of specialized circuits is to determine whether the clock connections, data signal transmission connections and read/write conditioning connections are short-circuited, or even to determine whether the current in the card is too high.

There are therefore two types interface: a first interface between these specialized circuits and the chip card, and a second interface between these specialized circuits and the reader's data processing system. In terms of the chip card, the interface is well determined, from a physical point of view, but as there are two types of card (synchronous and asynchronous), it must be a dual type. In terms of the reader's data processing system, the interface varies greatly from one specialized circuit manufacturer to another. However, all specialized circuits include status registers, which report normal operation or any faults detected. These status registers are loaded with one word per test carried out. To obtain information about the operation of a chip card, you must read these status registers.

In the circuits which are known to this date, the interface between the specialized circuit and the data processing system uses a great many connections which enable, first of all, the card to be addressed with the necessary signals and, secondly, the different internal circuit registers, which are used to carry out the functions listed above, to be managed. We therefore often find:

8 connections, generally called D0-D8, corresponding to the data bits to be written in these registers, a certain number of control connections (usually 3), enabling this data to be read and written in the registers, a connection for each signal on the printed circuit card which the interface is capable of managing (all are not always available).

In addition to the hardware complexity resulting from this large number of wires (one per connection), this requires an additional software interface in the data processing system in order to manage the relations with the specialized circuit. At the same time, irrespective of the chip to be managed, we already have at least the card/reader software interface (synchronous or asynchronous) which is needed to manage the card or the reader, and very often both, as the software interface with asynchronous circuits is standardized, and therefore well known. It is therefore possible to have this interface without any additional information about the chip.

The purpose of the invention is to reduce the number of connections between the reader's data processing system and the specialized circuit, to reduce, in practice, the number of connection pins in the specialized circuit, and to ensure that the reader's data processing system only needs to know two interfaces instead of three. For this purpose, the interface between the specialized circuit and the data processing system of the reader is such that it emulates completely the interface between this specialized circuit and a synchronous type chip card (same number of connections, same protocol). In this case, we still have three interfaces, one between the data processing system and the specialized circuit and two between this specialized circuit and the chip cards, but the first interface is the same as one of the last two: it corresponds to synchronous chips.

SUMMARY OF THE INVENTION

To reduce this hardware complexity and to eliminate this additional software interface, the invention proposes a specialized interface circuit for chip cards, comprising a first set of connections to be connected to the card, a second set of connections to be connected to a card reader's data processing system, and a control register for controlling the circuit's operation. The main characteristics are, firstly, that this second set of connections comprises a sub-set of connections which are identical to the first set and a switching control connection and, secondly, the circuit comprises means of switching allowing either the connections of the sub-set to be linked respectively to the corresponding connections in the first set, or the connections of the sub-set to be connected to the control register, under the effect of the control connection.

BRIEF DESCRIPTION OF THE DRAWINGS

Other specific features and advantages of the invention will appear clearly in the description below, which refers to the attached figures, representing:

FIG. 1, a simplified diagram of an interface circuit, according to the invention, and FIG. 2, a simplified diagram illustrating the management of a control register, FIG. 3, a diagram representing a write sequence in the control register of such a specialized circuit.

DESCRIPTION OF THE PREFERRED EMBODIMENT OF THE

The representation of the interface circuit 100 in FIG. 1 is limited to the specific resources of the invention, for reasons of clarity. Furthermore, it also comprises, of course, all the elements necessary for its operation and for adapting the printed circuit card to the reader. The operation of these known elements is controlled by control registers, grouped together in a single register, 101, in the figure. The management of the specialized circuit therefore involves reading the contents of these registers, to check, for example, the quality of an effective voltage written in it during a supply test. It also involves writing certain stages of the register, to progam the value of this same voltage, for example. In the stages of the register, we write control words. In the current version, just one bit corresponds to each stage: the control word is therefore a one-bit word.

Furthermore, the specialized circuit must communicate with the chip card, via eight standardized connections. In the figure, we have only represented the clock connections (CLK), the trigger connections (RST-Reset to Zero), the read/write conditioning connections (R/W) and the serial input/output connections (I/O), which are concerned by the invention. The other connections, which are not represented, are operated in the standard way.

With the invention, the circuit 100 communicates, at the reader side, with the reader's data processing system, by means of a limited number of connections, comprising a few known connections, which are not represented, such as, for example, a power supply connection and a group of five connections comprising a sub-set of four connections (CLK, RST, R/W, I/O) identical to those specified above, plus a fifth REGWR connection for selecting these four connections.

The four identical connections are connected to the inputs of a four-way switch 102, which enables them to be directed together, respectively, either to the four corresponding connections on the card, or to control register 101, via an internal link 103. The term "input"- should be taken in the broadest sense, in order to enable a two-way link whenever necessary (in the event of I/O read/write connection, for example). This switch 102 and the link 103 can be established in any way known in the art and comprise, for example, four switches 104, or different multiplexing systems.

In its operating principle, the switch 104 comprises an input 105 linked to two pairs 106 and 107 of complementary transistors N and P mounted in parallel. The transistors of these pairs receive respectively on their control grid the signals available on the REGW connection, together with the signals which complement these signals by means of a logical inverter 108. Depending on the nature of the signal available on the REGW connections, the reader's CLK RST I/O and R/W connections are linked to the card or to the control register 101.

To control this switching operation, the switch 102 receives in a control entry the REGWR connection, which enables the reader's signals to be sent either to the card or to the register 101.

In normal permanent operation, when the card is in the reader, the circuit 100 is transparent and the signals from the reader's data processing system are therefore applied directly to the card, passing through the circuit without any changes other than a possible clock delay.

However, when the reader's data processing system has to control the operation of the circuit 100 via the control register 101, for example, at the moment of the insertion or renewal of the card from the reader, this data processing system controls the tripping of switch 102, via connection REGWR, which directs the signals of the four other connections to the register 101. The data processing system can then read and/or write in this 101 register while utilizing an interface software which is identical to the one utilized to read and/or write in the chip card's memory. This software is already available since, either the chip card is the asynchronous type and this software is known for all cards of this type, or it is the synchronous type and, in this case, the software is already known in the exchange with the card: it is not necessary to design a third one.

In FIG. 2, we have represented the control register 101, fitted with its different stages 109 to 10n, containing the control words. This register is addressed like a synchronous type chip card memory, by choosing a stage to be read or in which a write operation must be performed, with the orders available on the RST and CLK connections. Once this stage has been chosen, the register includes an automatic system for writing in a buffer stage 112 the contents of what has been read in the addressed stage, or to write in the addressed stage information identical to that loaded from the reader in the buffer stage 112. The choice between these two operations depends on the status of a signal available on the R/W connection.

In FIG. 3, we have represented a sequence in which, for example, the REGW connection switches the other connections to the register 101, via a high level. After resetting by the RST connection, which switches temporarily to a high level, the system successively accesses all the stages of the register 101 via the I/O connection, at the clock rate CLK. During each clock cycle, the register is configured for read operations first, then, if applicable, depending on the order available on the R/W connection, for write operations. Accordingly, in the figure, we have successively a read operation on stage 109, then read followed by write on stage 110 (R/W switches to a high level) and a read on this stage 110 (R/W returns to low level).

With the invention, it is therefore possible to limit the number of connections between, the specialized interface circuit 100 and the reader's data system and to use a single software interface (or protocol), between the system and the circuit, and between the system and the chip card.

We claim:

1. Specialized interface circuit for chip card, comprising a first set of connections to be connected to the card, a second set of connections to be connected to a card reader's data processing system, and a control register for controlling the circuit operation wherein the second set of connections comprises a sub-set of connections which are identical to the first set and a switching control connection, and that the circuit also comprises means of switching enabling either the connections of the sub-set to be linked respectively to the corresponding connections in the first set, or the connections of the sub-set to be linked to the control register, actuated by the control connection.

2. Circuit according to claim 1, wherein the control register is organized to be able to be written and/or read via the sub-set connections from the reader's data processing system, with a software interface which is identical to the read/write interface of a synchronous type chip card.

3. Circuit according to any of claims 1 or 2, wherein the connections of the first set and the connections of the sub-set comprise a clock connection, a reset connection, a read or write configuration connection, and an input-output connection. 1

* * * * *